Sept. 30, 1924.

G. FONLUPT 1,510,170

DUMPING VEHICLE

Filed Aug. 29, 1921   6 Sheets-Sheet 2

Inventor
Georges Fonlupt
by H.B.Wilson &co
Attorneys

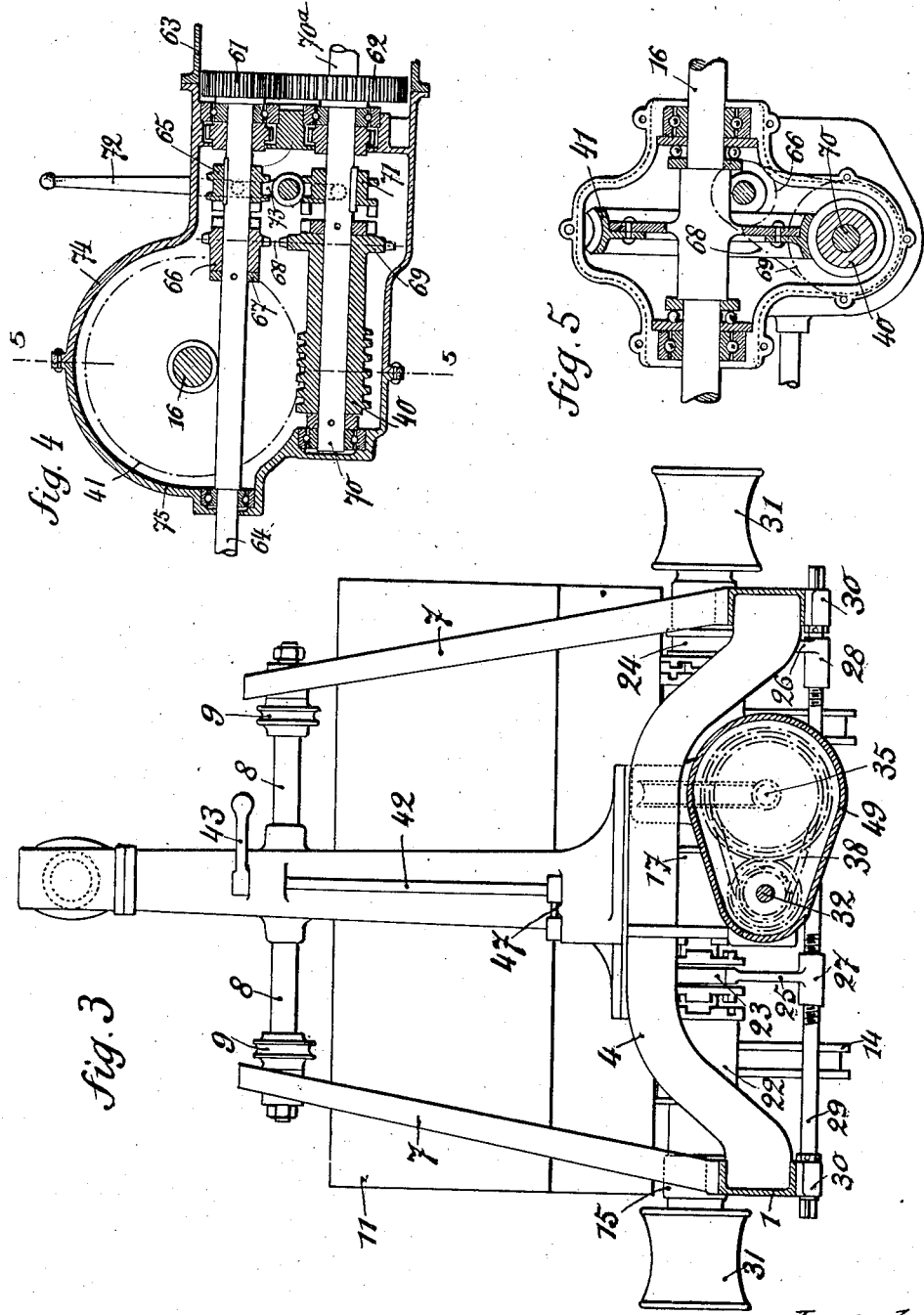

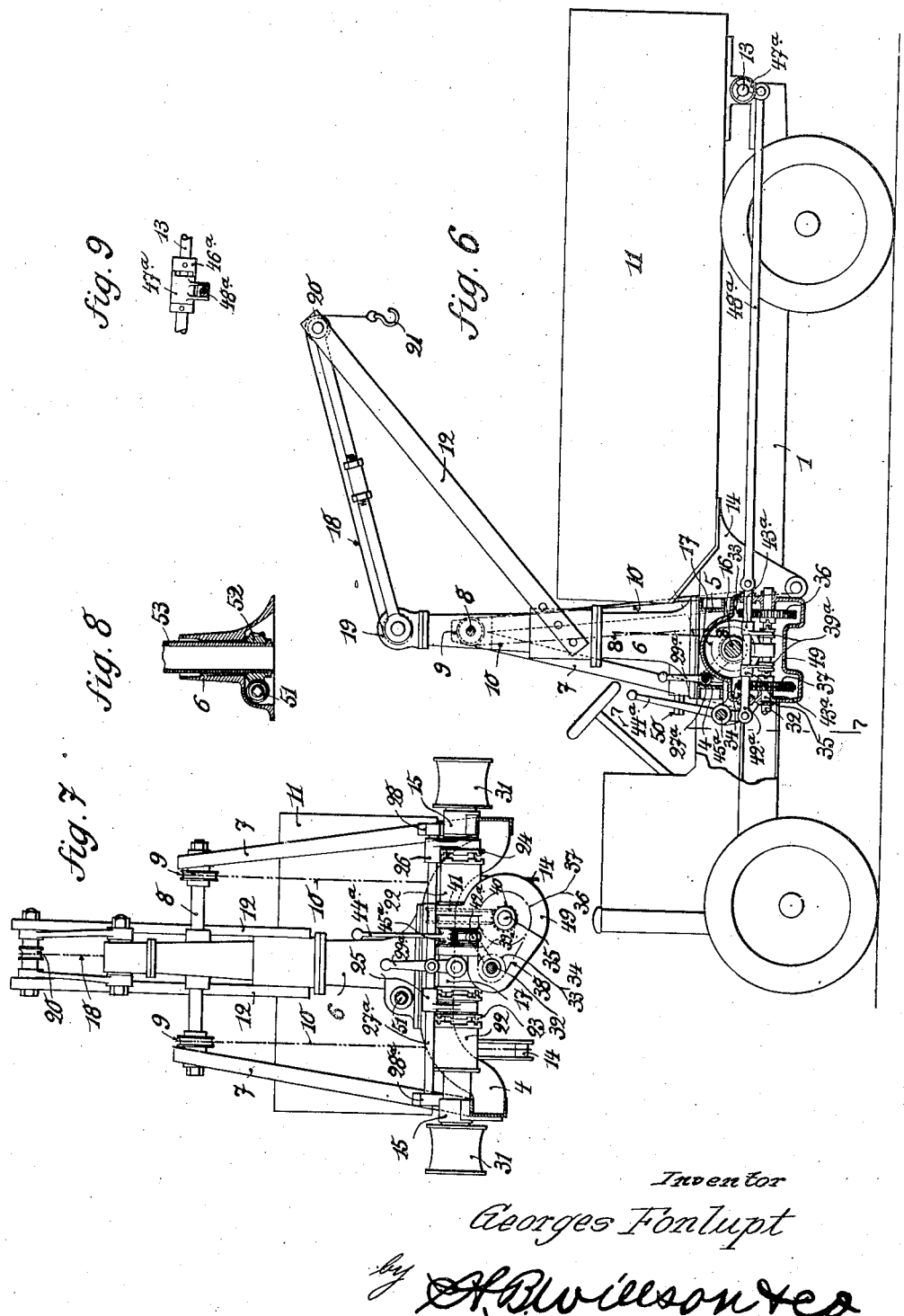

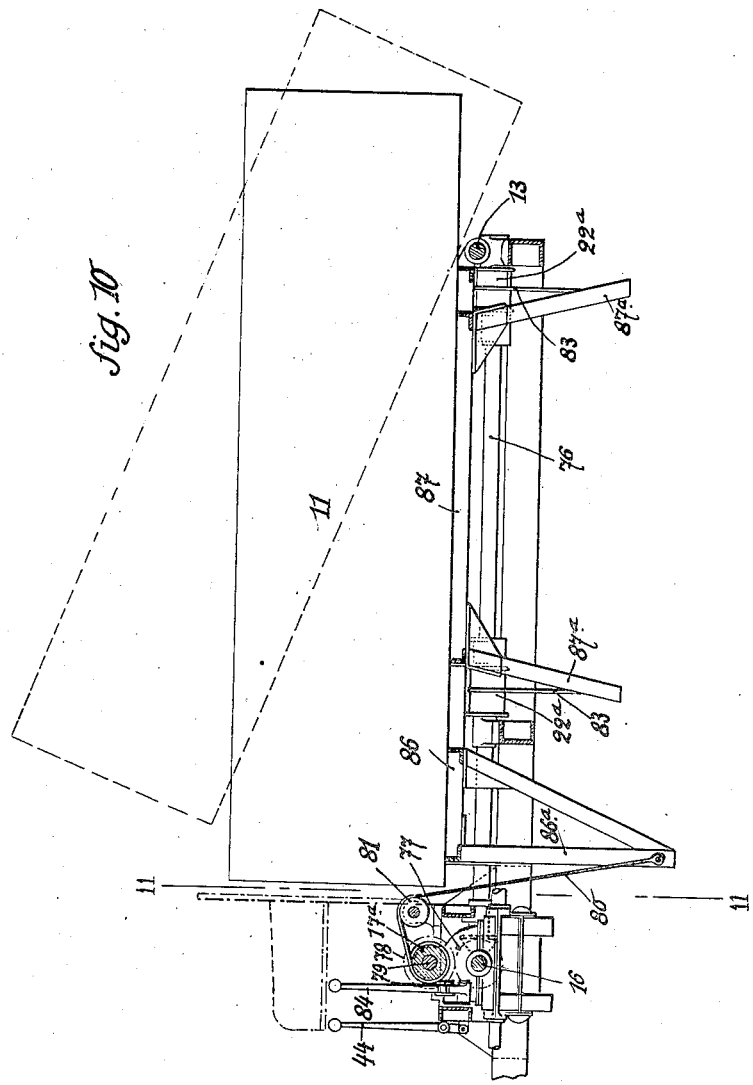

Sept. 30, 1924.
G. FONLUPT
1,510,170
DUMPING VEHICLE
Filed Aug. 29, 1921
6 Sheets-Sheet 6
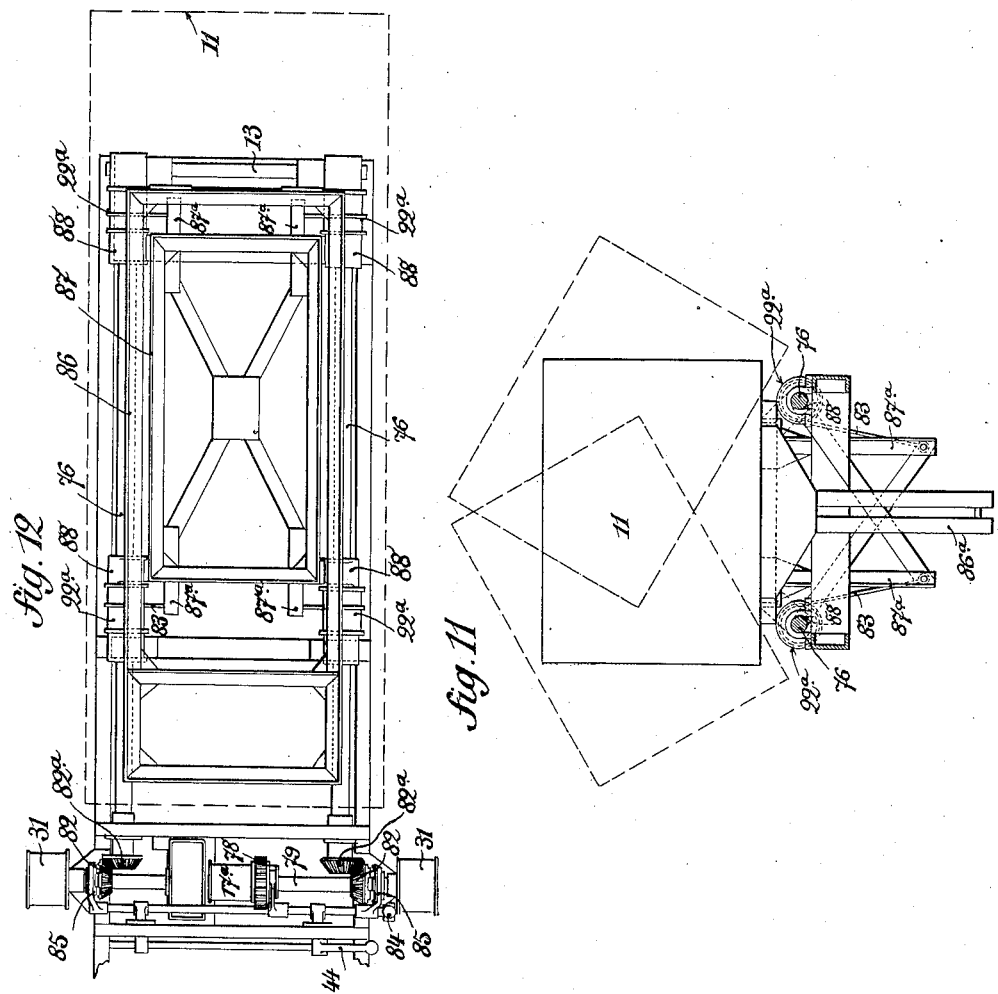
Inventor
Georges Fonlupt
by H. B. Wilson & Co
Attorneys Patented Sept. 30, 1924.

1,510,170

UNITED STATES PATENT OFFICE.

GEORGES FONLUPT, OF PARIS, FRANCE.

DUMPING VEHICLE.

Application filed August 29, 1921. Serial No. 496,556.

*To all whom it may concern:*

Be it known that I, GEORGES FONLUPT, a citizen of the Republic of France, and residing at Paris, Seine Department, No. 70 Rue Saint-Lazare, in the Republic of France, engineer, have invented certain new and useful Improvements in Dumping Vehicles, of which the following is a specification.

This invention relates to a motor vehicle for hauling goods, and has for its object a vehicle of this kind comprising in combination with a vehicle frame of any suitable type, a vehicle body of any desired construction and of the ordinary or the tipping type, a crane for loading and unloading the said vehicle body, and a capstan adapted to be used for the traction of the vehicle should the wheels become stuck in the mud.

The invention also relates to special arrangements of the mechanism for actuating the vehicle body, the crane and the capstan, whereby the invention may be applied with facility to all suitable vehicles of the known types such as large or small hauling wagons, tractors or the like, and even to trailers or the horse vehicles or others without requiring any changes in the vehicle frame.

The following description, together with the accompanying drawings which are given by way of example, sets forth various embodiments of this invention.

Figure 3 is a vertical cross section on the line 3—3 of Fig. 1.

Figure 4 is a longitudinal section of a modified form of construction of the actuation mechanism of the drum shaft.

Figure 5 is a cross section on the line 5—5 of Fig. 4.

Figure 6 is an elevational view partly in vertical section of a second plan of construction of the vehicle.

Figure. 7 is a cross section on the line 7—7 of Fig. 6.

Figure 8 is a partial vertical section on the line 8—8 of Fig. 6.

Figure 9 is a partial elevation of the rear part of the frame.

Figure 10 is an elevational view partly in section of a third form of construction of the vehicle wherein the body is adapted to swing not only endwise but also sidewise.

Figure 11 is a cross section on the line 11—11 of Fig. 10.

Figure 12 is a plan view of the vehicle frame according to Fig. 10.

Figure 1:
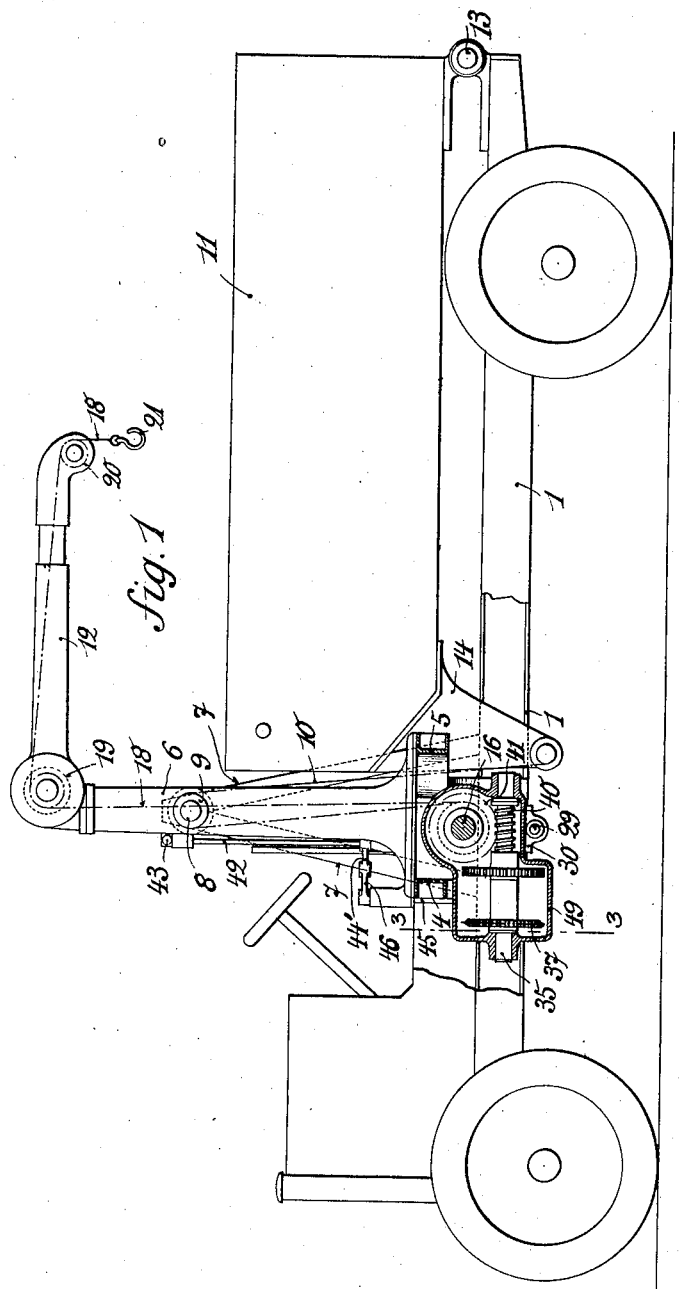
Fig. 1 is an elevation view partly in vertical section of the first embodiment.
Figure 2:
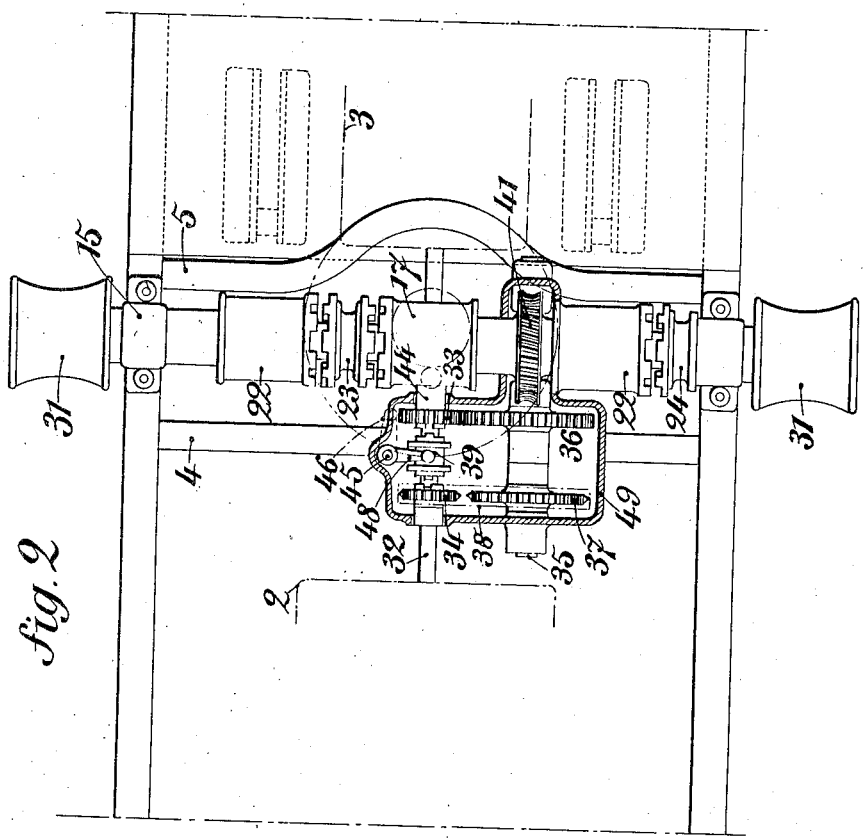
Figure 2 is a plan view on a larger scale of the actuating mechanism, portions being shown in section.

In Figs. 1 to 3, 1 indicates a vehicle frame of known type, and 2 indicates the engine in a diagrammatic manner. According to this invention, the main beams of the frame have secured thereto two cross-pieces 4, 5 having a suitably curved shape and adapted to support the upright 6 of the crane as well as the actuating mechanism to be described hereafter. To the said main beams are also secured two supports 7 of inverted V shape, which are rigidly connected with the said upright 6 by the axles 8, upon which are loosely mounted the pulleys 9 co-operating with the cables or chains 10 used for raising the swinging vehicle body 11. At the same time, the supports 7 which are thus secured to the upright 6 will serve to strengthen the latter and will enable it to support the heavy loads suspended at the end of the crane arm 12, which latter is adapted to pivot about the axis of the upright in all directions.

The body 11 is pivoted at 13 to the rear end of the frame, and is provided at the front part with the downwardly extending arms 14 having secured thereto the cables 10. To the said beams of the frame are also secured the bearings 15 carrying the shaft 16 of the winches and the capstan.

17 indicates a winch for raising the load by the use of the cable 18 which passes through the upright 6 and the arm 12. 19 and 20 are guide pulleys mounted in the arms 12, and 21 is the lifting hook. To the right and left of the crane are disposed the winches 22 for raising the vehicle body by means of the cables 10. These three winches are mounted loose on the shaft 16 and may be coupled in an alternative manner by means of the jaw clutch sleeves 23, 24 slidable on the shaft 16 and controlled by the forks 25, 26. These forks are provided with internally threaded sleeves 27, 28 forming nuts and mounted on a screwthreaded rod 29 journaled below the said main beams in the bearings 30 and revoluble by means of a handle from either side of the vehicle. The rotation of the said rod in either direction will shift the jaw clutch sleeves 23, 24 in such manner as to cause the first sleeve to engage the crane winch, the other two winches being now released. The rotation of the rod 29 in the contrary direction will release the said crane winch and will engage the two winches 22 of the vehicle body.

To the ends of the shaft 16 are keyed the capstan drums 31 which are disposed outside the main beams. The shaft 16 is actuated from the shaft 32 connecting the engine to the change-speed box. Upon the said shaft are mounted loosely a gear wheel 33 and a sprocket wheel 34. To a shaft 35 parallel to the shaft 32 are keyed a gear wheel 36 co-operating with 33 and a sprocket wheel 37 connected with the wheel 34 by the endless chain 38. A jaw clutch sleeve 39 slidable on the shaft 32 is used to connect with the said shaft either the wheel 33 or the wheel 34, whereby the shaft 35 may be driven in one or the other direction.

The shaft 35 drives the shaft 16 by means of a worm 40 and a worm wheel 41. The reversal of movement is obtained by shifting the sleeve 39 by means of the vertical shaft 42 having secured to one end thereof a handle 43 and to the other an arm 44', of a second vertical shaft 45 having at one end a handle 46 connected by a link 47 with the handle 44, and at the opposite end a fork 48 acting upon the sleeve 39. All the said gearing is contained within the casing 49.

Hand operation is employed for the rotation of the arm 12 upon the upright 6, for the purpose of handling goods from either side of the vehicle, the goods being raised from the ground and brought above the vehicle body and then lowered into the latter. In the case of goods which are not of a fragile nature, these may be emptied into the body, and the latter may be subsequently unloaded by pivoting about the axle 13. Should it be necessary to handle the goods without shocks, these will be let down gradually into the body, and will be again unloaded by the use of the crane which lifts the goods out of the body and deposits them on the ground at either side of the vehicle.

All desired movements may be obtained by operating the rod 29 and the shaft 42. To drive the crane, the rod 29 is rotated in order to engage the winch 17, then the shaft 42 is rotated in one or the other direction according as the load is to be raised or lowered. In like manner, to operate the vehicle body, the rod 29 is rotated in order to engage the winches 22, and then the shaft 42 is rotated in the suitable direction for raising or lowering the body. The driving device comprising the worm 40 and worm wheel 41 is irreversible, and in this manner the wheels 33 and 34 may be engaged or released at all times without requiring any attention to be paid to the braking or the engagement of the winches, the cables or the vehicle body, or to the release of the same. On the other hand, the use of the capstans will only require the operation of the shaft 42 in one or the other direction. For this reason, even though the apparatus is adapted to be used for various purposes, its operation is very readily carried out, and it may be placed in the hands of comparatively unskilled persons.

Without departing from the spirit of this invention, either the vehicle body, the crane or the capstan may be omitted. On the other hand, instead of the above-described devices for reversal of movement, any other equivalent mechanism may be employed; for instance the wheels 34, 37 and the chain 38 may be replaced by two spur gears and an intermediate pinion, or the like. Variations may also be made in the shape of the cross-pieces 4, 5 and in the construction of the upright 6 and the arm 12; any suitable actuating device may be provided for the rotation of the said arm; the vehicle body may be disposed for side tipping instead of for rear tipping, and the like.

The tipping body, the crane and the capstan as above described may also be installed upon the frame of a trailer or of a horse vehicle, and in this case the operation of the cross shaft carrying the capstan and the winches may be carried out by hand, for instance, by the use of a handle disposed upon an extension of the worm shaft 35. In this case the change-speed gears will be omitted. For a trailer drawn by a mechanical tractor, the operation may still be effected by mechanical means from the tractor engine shaft by the use of a flexible power transmission device, a flexible shaft, or the like, disposed between the said power shaft and the shaft carrying the gear wheels 33, 34.

Figs. 4 and 5 represent an actuating mechanism for the drum shaft 16, the said mechanism being mounted upon the known type of change-speed box.

The gear wheels 61, 62 are change-speed gears pertaining to the change-speed box whose casing 63 is broken away. The gear wheel 61 is keyed to the shaft 64 proceeding from the clutch device of the vehicle, and it is provided with a keyed sleeve 65 adapted to slide and to engage by jaw clutch a sprocket wheel 66 mounted loose on the shaft and stopped by a ring 67. The gears 61, 62 serve either for the drive in one direction, or for the lifting of the crane and the vehicle body whereas the drive in the other direction or the descent is effected by means of the sprocket wheel 66 which actuates through the intermediary of the chain 68 the wheel 69.

The drive is carried out as follows. The wheel 62 is keyed to a shaft 70 disposed in line with the countershaft 70ª of the change-speed box. To the shaft 70 is keyed the sleeve 71 which is slidable thereon and is adapted to engage the wheel 69 under the control of a lever 72 actuating a swinging member 73 which provides for the engagement either of the sleeve 65 for the descending movement, or of the sleeve 71 for the lifting movement. In fact, when the sleeve 65 is engaged, it controls the sprocket wheel 66 and accordingly the wheel 69 which is secured to the worm 40 actuating through the medium of the wheel 41 the transverse driving shaft 16 of the drums. This operation will afford the reversal of motion. When the sleeve 71 is caused to engage the wheel 69, it actuates in like manner the shaft 16 but in this case for the direct drive. The operation of the drums and the engagement of the same is carried out as in the preceding device. The whole of the above-mentioned control mechanism is contained in a casing 74 provided with a cover 75.

The form of construction represented in Figs. 6 to 9 also comprises three drums 22, 17, 22 which are mounted loose on the shaft 16 and may be engaged in alternative manner by the jaw clutch sleeves 23, 24 slidable on the shaft 16 and controlled by the forks 25, 26.

These latter are mounted upon the shaft 27$^a$ slidable in the bearings 28$^a$ and actuated by the lever 29$^a$. Operating the said lever in one direction will so displace the jaw clutch sleeves 23, 24 as to engage the first sleeve with the crane winch, the other two winches being now disengaged, when the said lever 29$^a$ is moved in the contrary direction, the crane winch is released and the two winches 22 of the vehicle body are engaged. To the ends of the shaft 16 are keyed the drums of the capstan 31 which are situated outside the main beams of the frame.

The shaft 16 is actuated from the shaft 32 connecting the engine with the change-speed box. Upon the said shaft is loosely mounted a gear wheel 33 and a sprocket wheel 34; upon a shaft 35 parallel to the shaft 32 is keyed a gear wheel 36 engaging the wheel 33, and also a sprocket wheel 37 which is connected with the wheel 34 by means of the endless chain 38. The jaw clutch sleeves 39$^a$ are slidably disposed upon the shaft 32 whereby the said shaft is caused to engage either with the gear 33 or the sprocket wheel 34, and thus the shaft 35 may be rotated in either direction.

The shaft 35 drives the shaft 16 by means of the worm 40 and the worm wheel 41.

The reversal of movement is obtained by shifting the sleeves 39$^a$ by means of the shaft 42$^a$ which carries two forks 43$^a$ controlling the sleeves 39$^a$ through the medium of a hand lever 44$^a$ revoluble upon the stationary axle 45$^a$. All the said gearing is contained in a casing 49.

The operation of the levers 29$^a$ and 44$^a$ will suffice to produce all the desired movements. To drive the crane, the lever 29$^a$ is operated in such manner as to engage the winch 17, then the lever 44$^a$ is moved in one or the other direction according as it is desired to raise or lower the load. In like manner, to operate the vehicle body, the lever 29$^a$ is suitably moved in order to engage the winches 22, then the lever 44$^a$ is operated in the proper direction for raising or lowering the vehicle body.

It should be observed that the operation by means of the worm 40 and worm wheel 41 is irreversible, and in this manner the wheels 33, 34 may be engaged or released at all times without requiring any attention to be paid to the braking or the engagement of the winches, the cables or the vehicle body, or to the release of the same. On the other hand, when the vehicle body has reached the maximum upper point of the swinging movement, an automatic device will disengage the control mechanism, thus leaving the vehicle body in the upper position during the unloading of the same. This device is actuated by the vehicle body itself. Upon the shaft 13, used for the articulation of the vehicle body, is mounted a ring provided with a tappet 46$^a$, and when at the end of the stroke the said ring will actuate a loose lever 47$^a$ which through the intermediary of a link 48$^a$ is caused to act upon the shaft 42$^a$, thus releasing the sleeves 39$^a$ and placing them at the dead point. After the lever 44$^a$ has been employed to effect the engaging operation for the descent, the same releasing effect will be produced when the vehicle body has reached the inoperative position, and here the automatic disengagement is also afforded.

The pivoting movement of the crane is obtained by operating a shaft 50 by means of a crank, not shown, which is disposed within reach of the driver. This shaft 50 carries a worm 51 co-operating with a worm wheel 52 mounted upon the movable tube 53 constituting the pivoting axle of the crane. The crank controlling the shaft 50 is turned in one or the other direction to obtain the required amount of movement. Inasmuch as the said worm is irreversible, the crane may be stopped in any desired position without requiring the use of a pawl.

The use of the said capstans will only require the operation of the lever 44$^a$ in one or the other direction, and for this reason, even though the apparatus has a variety of uses, the operation of the same is of a very simple character and may be carried out by comparatively unskilled persons. It constitutes an assemblage which is quite complete and which may be erected separately and then mounted upon the vehicle, all that is required to be removed therefrom being the clutch shaft 32 in order to dispose the sleeves 39ª upon the latter.

Figs. 10 to 12 show a motor vehicle whose body is adapted for tipping either to the rear, or to the right and left. The said vehicle is not provided with a crane, as in the preceding cases. The operating mechanism is substantially the same as hereinbefore set forth differing however in the arrangement of the drums 22ª whose shafts 76 occupy the lengthwise position at the sides of the vehicle body. 77 indicates a gear wheel which is slidable on the shaft 16 and actuates through the intermediary of a second gear wheel 78 the shaft 79 having mounted thereon a drum 17ª for the rear tipping of the body. When the gear wheel 77 is engaged with the gear wheel 78, the drum 17ª—through the medium of a wire cable 80 disposed upon a guide roller 81—will actuate the vehicle body and will effect the tipping of the same about the shaft 13 disposed at the rear of the frame.

The side tipping of the body is carried out as follows:

For the drums 22 used for the vehicle body (Figs. 1 to 3) are substituted two pairs of bevel gears 82, 82ª actuating the shafts 76 of the drums 22ª having wound thereon the tipping cables 83. Each of the shafts 76 serves alternately as the driving shaft and as the pivoting axle of the body. To effect the tipping of the body to the right, the left hand shaft actuates the left hand cable drums, whereas the right hand shaft serves as the pivoting axle; for the left hand tipping, the reverse operation is carried out.

The actuating device is similar to the preceding. The hand lever 84 is used to engage one or the other of the bevel gear sets 82, 82ª by means of the jaw clutch sleeves 85 slidable on the shaft 16, thus providing for the right or left hand tipping of the body. When at the middle of its stroke, the lever effects the engagament of the shaft 16 with the gear wheel 77 which controls the rear tipping of the body.

The reversal of motion for the raising and lowering is obtained by means of a hand lever 44 and in the same manner as in the preceding case. The body 11 rests upon two frames 86, 87, disposed one within the other and in an independent position. The outer frame 86 is secured to the shaft 13 and the frame 87 bears upon the shafts 76 by means of inverted U shaped straps 88 permitting the upward movement of the said frame to the right and left in turn. The vehicle body is secured to the frame 86 or 87 according to requirements by means of locking bolts or like means members, not shown.

The frames 86, 87 are provided with the arms 86ª, 87ª which are downwardly extending and have respectively secured to the lower ends thereof the cables 80, 83. This disposition is represented as applicable to a hauling vehicle, but is also applicable to trailers, and in this case it will suffice to interpose a universal joint device between the vehicles whereby the actuating movement of the motor vehicle may be transmitted to the trailer.

Claims—

1. In a motor vehicle with tipping body, the combination of a chassis, a transverse shaft at the rear of said chassis, longitudinally extending shafts disposed at the sides of said chassis, a first frame pivoted to the said transverse shaft, a second frame having connecting elements disposed upon the sides thereof and adapted to bear by means of said elements upon said longitudinally extending shafts, means for raising the front end of the first frame, and means for tilting the second frame transversely, the said vehicle body being adapted to rest upon the said frames.

2. In a vehicle, the combination of a chassis, a transverse shaft at the rear thereof, two longitudinal shafts disposed at the sides of said chassis, a first frame pivoted to the said transverse shaft, a second frame having connecting elements disposed upon the sides thereof and adapted to bear by means of said elements upon the longitudinally extending shafts, a transverse driving shaft disposed upon said chassis forwardly of the said frames, means for rotating said driving shaft in either direction, beveled gears upon said transverse shaft, clutching means for the alternate coupling of each of said bevel gears to the said transverse shaft, bevel gears mounted upon the said longitudinal shafts and engaging the first mentioned bevel gears, winch drums secured to the said longitudinal shafts, a winch drum loose upon said transverse driving shaft, and clutching means for coupling the last mentioned winch drum to the said driving shaft.

In testimony, that I claim the foregoing as my invention I have signed my name in presence of a subscribing witness.

GEORGES FONLUPT.

Witness:
MARCEL COMPIN.